Oct. 15, 1946. W. H. ALTON ET AL 2,409,338
EMULSION
Filed May 28, 1943
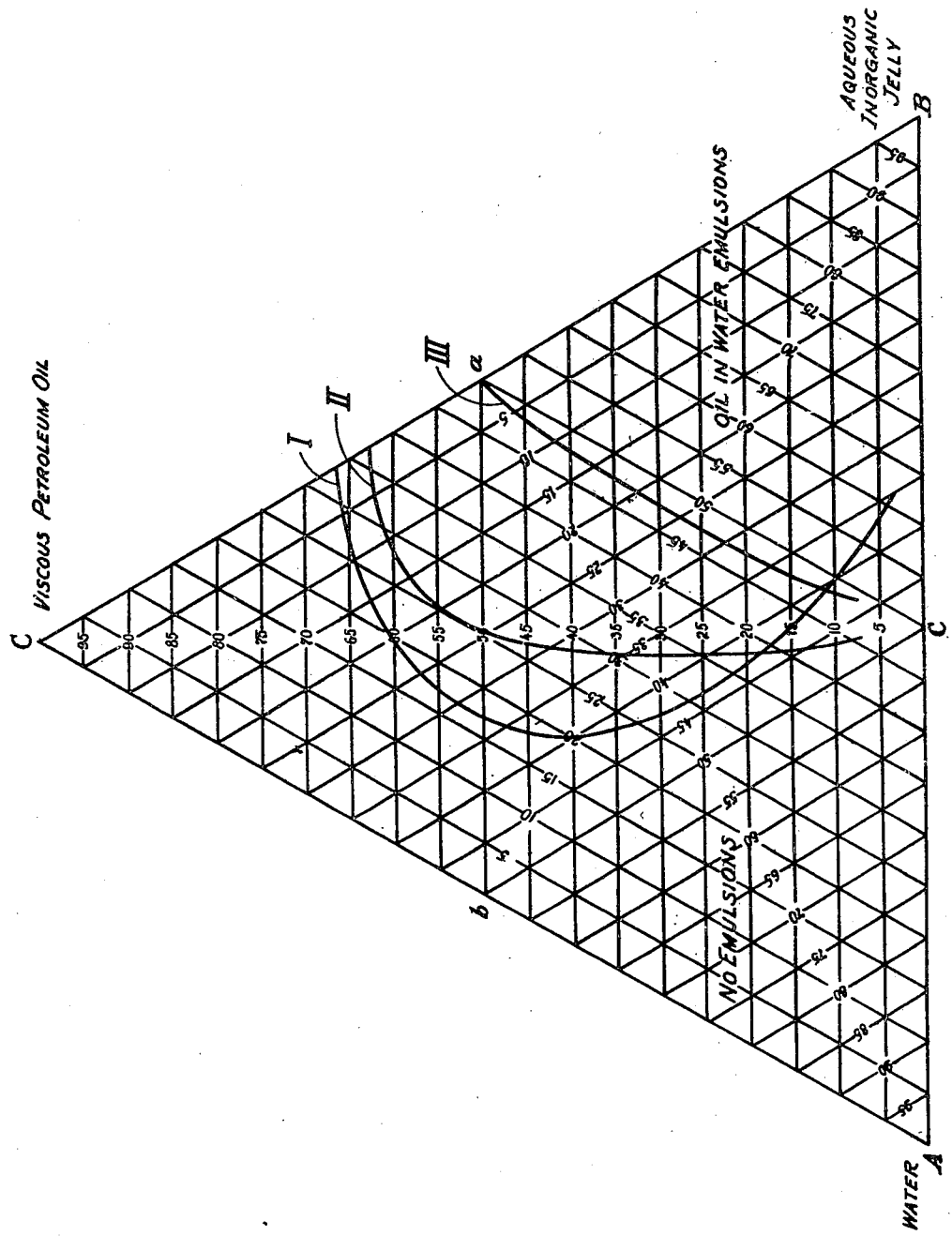
INVENTORS
WILLIAM H. ALTON
FRANCIS E. HUTCHINS
BY
Pennie, Davis, Marvin & Edmonds
ATTORNEYS Patented Oct. 15, 1946

2,409,338

UNITED STATES PATENT OFFICE 2,409,338

EMULSION

William H. Alton, Westport, and Francis E. Hutchins, Norwalk, Conn., assignors to R. T. Vanderbilt Company, Inc., New York, N. Y., a corporation of New York Application May 28, 1943, Serial No. 488,916

2 Claims. (Cl. 167—63)

We have invented a new product, produced from viscous petroleum oils, water and certain clays, which we have found to be useful as a substitute for lanolin and the like in cosmetic and pharmaceutical products.

Our new product is an oil-in-water emulsion comprising a viscous petroleum oil, water and the solids of an inorganic jelly produced as the aqueous effluent by centrifuging an aqueous suspension of a swellable clay containing 5%–10% by weight of solids at 800–1500 g. The emulsion may contain as much as about 65% by weight of viscous petroleum oil and, although it may contain as little as 1% by weight of viscous petroleum oil, it is particularly advantageous with viscous petroleum oil contents upwards of about 50% by weight.

In referring to "viscous petroleum oils," we refer to petroleum stocks having viscosities upwards of about 70 seconds at 100° F. Saybolt Universal. Petroleum stocks having a viscosity ranging from about 100 seconds to about 350 seconds at 100° F. Saybolt Universal are particularly useful. The swellable clays from which the inorganic jelly is produced are hydrated silicates of magnesium, aluminum and calcium or hydrated complexes of these silicates, and include Bentonite. The clay should be plastic when wet and should absorb without separation at least ten times its own weight of water. Workable deposits of such clays occur in California, Nevada and New Mexico.

Our new product is produced as follows: The swellable clay is soaked and ground with from nine to ten times its weight of water to form a substantially uniform suspension, and the water content of this suspension is then adjusted so that the suspension contains between 5% and 10% by weight of solids. In general, we have found it advantageous to work with a solids content not exceeding about 8%. This aqueous suspension containing 5%–10%, or better 5%–8%, by weight of solids is centrifuged at 800–1500 g. in a machine with an imperforate basket from which the aqueous inorganic jelly is taken off as the aqueous effluent. At this point, the aqueous effluent from the centrifuge, diluted with an equal volume of water and whirled for five minutes in a laboratory centrifuge, should show no trace of separated solids. The water content of the inorganic jelly, recovered as the aqueous effluent from the centrifuging operation, is then adjusted so that the jelly contains from 1% to 15% by weight or somewhat more of solids. The viscous petroleum oil is then dispersed, as in conventional emulsification, in this aqueous jelly, with or without added water.

The water content of the emulsion constituting our new product may be derived entirely from the water component of the aqueous jelly with which the oil is emulsified or it may be derived in part from added water. Appropriate account is to be taken of any additional water to be supplied to the emulsion in adjusting the water content of the aqueous jelly prior to emulsification. In general, we prefer to emulsify the oil in an aqueous jelly containing about 4%–6% of solids and to dilute with added water the emulsion thus produced to produce emulsions of higher water content. The emulsions thus produced may contain, for example, from about 1% to about 65% by weight of viscous petroleum oil, from about 98% to about 34% of water and, advantageously, from about 0.75% to about 10% of the inorganic jelly solids. A minimum of about 0.75% of the inorganic jelly solids is required to produce a stable emulsion; with concentrations of these solids much exceeding 10% the emulsion becomes extremely stiff and viscous.

A centrifuge, and the operation of that centrifuge, appropriate for production of the aqueous inorganic jelly to which we have referred is described in detail in our application filed August 26, 1942, Serial No. 456,284. According to the disclosure of that application, the aqueous inorganic jelly is produced by suspending the swellable clay in water, adjusting the water content of the suspension, centrifuging the suspension and recovering the product as the aqueous effluent. The swellable clay is soaked or ground with from nine to ten times its weight of water to form a substantially uniform suspension and the water content of this suspension is then adjusted so that the suspension contains between 5% and 10% by weight of solids.

Further to illustrate our invention, and the production of our new product, we have diagrammed in the accompanying drawing the range of proportions for emulsification of three different viscous petroleum oils with, to permit comparison, the same aqueous inorganic jelly. The aqueous inorganic jelly used in these emulsions contained 4% by weight of solids, and the concentration indicated on the B—b axis in the drawing is concentration with respect to this particular jelly which also contained 96% of water. Concentrations with respect to oil and jelly for emulsions without added water are thus indicated along the line B—C and concentration with respect to added water, that is, water in addition to the water content of the aqueous inorganic jelly used, is indicated on the axis A—a. Concentration with respect to viscous petroleum oil is indicated on the axis C—c. Line I represents maximum oil concentration for a petroleum white oil having a viscosity of 125–135 seconds at a 100° F. Saybolt Universal. Line II represents maximum oil concentration for a petroleum lubricating oil, yellow in color, having a viscosity of 100 seconds at 100° F. Saybolt Universal. Line III represents maximum oil concentration for a petroleum white oil having a viscosity of 325–350 seconds at 100° F. Saybolt Universal. Stable emulsions embodying our invention were produced with the proportions represented by the areas between these several lines and the point B in the drawing.

Our new product can be substituted, or in part substituted, for lanolin and the like in ointments, emollients, creams, soap mixtures, pastes, salves and similar cosmetics and pharmaceutical products. It combines the hydroscopic and emollient properties of the aqueous inorganic jelly with the unctuous properties of the viscous petroleum oil. The aqueous inorganic jelly acts as an emulsifying agent, and as a particularly advantageous one, and also contributes directly to the desirable properties of the composite, thus serving a double function in the emulsion. As an emulsifying agent, the aqueous inorganic jelly is effective in the same low concentrations, with respect to solids, as those in which it is itself of optimum value.

The symbol "g." as used herein designates a unit of force, namely, that of gravity, so that the expression "800–1500 g." means that the force applied is 800 to 1500 times the gravitational force.

We claim:

1. An oil-in-water emulsion suitable for use in cosmetic and pharmaceutical preparations comprising about 1%–65% of a viscous petroleum oil, about 34%–98% of water and about 0.75%–10% of the solids of an inorganic jelly produced as the aqueous effluent by centrifuging an aqueous suspension of a swellable clay containing 5%–10% by weight of solids at 800–1500 g.

2. An oil-in-water emulsion suitable for use in cosmetic and pharmaceutical preparations comprising about 50%–65% of viscous petroleum oil, about 34%–49% of water and about 0.75%–10% of the solids of an inorganic jelly produced as the aqueous effluent by centrifuging an aqueous suspension of a swellable clay containing 5%–10% by weight of solids at 800–1500 g.

WILLIAM H. ALTON.
FRANCIS E. HUTCHINS.